(12) United States Patent
Harrison, Jr.

(10) Patent No.: US 7,975,981 B2
(45) Date of Patent: Jul. 12, 2011

(54) ACTUATOR FOR CONTROLLING MATERIAL FLOW AND RELATED SYSTEM AND METHOD

(75) Inventor: John H. Harrison, Jr., Plano, TX (US)

(73) Assignee: Harrison AG Technologies, Inc., Mobridge, SD (US)

( * ) Notice: Subject to any disclaimer, the term of this patent is extended or adjusted under 35 U.S.C. 154(b) by 404 days.

(21) Appl. No.: 12/157,403

(22) Filed: Jun. 10, 2008

(65) Prior Publication Data
US 2009/0050831 A1 Feb. 26, 2009

Related U.S. Application Data

(60) Provisional application No. 60/966,127, filed on Aug. 24, 2007.

(51) Int. Cl.
*F16K 31/02* (2006.01)

(52) U.S. Cl. .............. 251/129.15; 251/30.04; 251/30.03

(58) Field of Classification Search ............. 251/129.04, 251/129.15, 30.01, 30.02, 30.03, 30.04
See application file for complete search history.

(56) References Cited

U.S. PATENT DOCUMENTS

| | | | | |
|---|---|---|---|---|
| 2,251,441 A * | 8/1941 | Dillman | ................... | 137/316 |
| 3,114,532 A * | 12/1963 | Gray et al. | ................... | 251/30.01 |
| 3,154,285 A * | 10/1964 | Houie | ................... | 251/30.04 |
| 4,003,532 A | 1/1977 | Adams, Sr. et al. | | |
| 4,310,789 A | 1/1982 | Mank et al. | | |
| 4,321,678 A | 3/1982 | Krogmann | | |
| 5,217,200 A * | 6/1993 | Hutchings et al. | ................. | 251/86 |
| 5,585,788 A | 12/1996 | Hashimoto et al. | | |
| 5,653,389 A | 8/1997 | Henderson et al. | | |
| 5,704,546 A | 1/1998 | Henderson et al. | | |
| 5,971,294 A | 10/1999 | Thompson et al. | | |
| 6,199,000 B1 | 3/2001 | Keller et al. | | |
| 6,298,303 B1 | 10/2001 | Khavakh et al. | | |
| 6,491,062 B1 * | 12/2002 | Croft | ................... | 137/624.11 |
| 6,553,312 B2 | 4/2003 | Upadhyaya et al. | | |
| 6,567,013 B1 | 5/2003 | Purkis et al. | | |
| 6,655,652 B2 * | 12/2003 | Meinhof | ................... | 251/65 |
| 6,680,694 B1 | 1/2004 | Knockeart et al. | | |
| 6,941,225 B2 | 9/2005 | Upadhyaya et al. | | |
| 6,959,718 B2 * | 11/2005 | Kayahara et al. | ................... | 137/15.01 |
| 7,028,978 B2 * | 4/2006 | Kumar | ................... | 251/129.07 |
| 7,124,964 B2 | 10/2006 | Bui | | |
| 7,311,004 B2 | 12/2007 | Giles | | |
| 7,388,662 B2 | 6/2008 | Cantin et al. | | |
| 7,801,677 B2 | 9/2010 | Harrison, Jr. et al. | | |
| 2002/0163462 A1 | 11/2002 | Takase et al. | | |
| 2002/0180271 A1 | 12/2002 | Taniguchi et al. | | |
| 2003/0036847 A1 | 2/2003 | Geier et al. | | |
| 2003/0182260 A1 | 9/2003 | Pickett et al. | | |
| 2003/0191568 A1 | 10/2003 | Breed | | |
| 2004/0034459 A1 | 2/2004 | Hoelscher et al. | | |
| 2005/0000277 A1 | 1/2005 | Giles | | |
| 2006/0273189 A1 | 12/2006 | Grimm et al. | | |
| 2007/0180078 A1 | 8/2007 | Murphy et al. | | |
| 2008/0309259 A1 | 12/2008 | Snijder et al. | | |

\* cited by examiner

*Primary Examiner* — John K Fristoe, Jr.

(57) ABSTRACT

An apparatus (such as a valve assembly or other actuator) includes a pressure plate having a first hole and a second hole. The apparatus also includes a plunger configured to selectively cover the second hole of the pressure plate. The apparatus further includes a coil configured to move the plunger away from the pressure plate to uncover the second hole of the pressure plate in order to allow a material to flow through the apparatus. The coil is also configured to move the plunger towards the pressure plate to cover the second hole of the pressure plate in order to block the material from flowing through the apparatus. Pressure may equalize on a first side and a second side of the pressure plate after the plunger covers the second hole of the pressure plate.

20 Claims, 8 Drawing Sheets

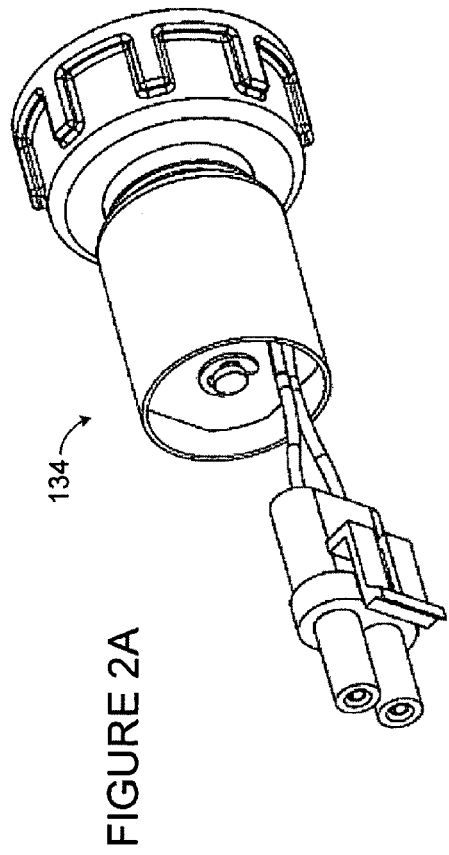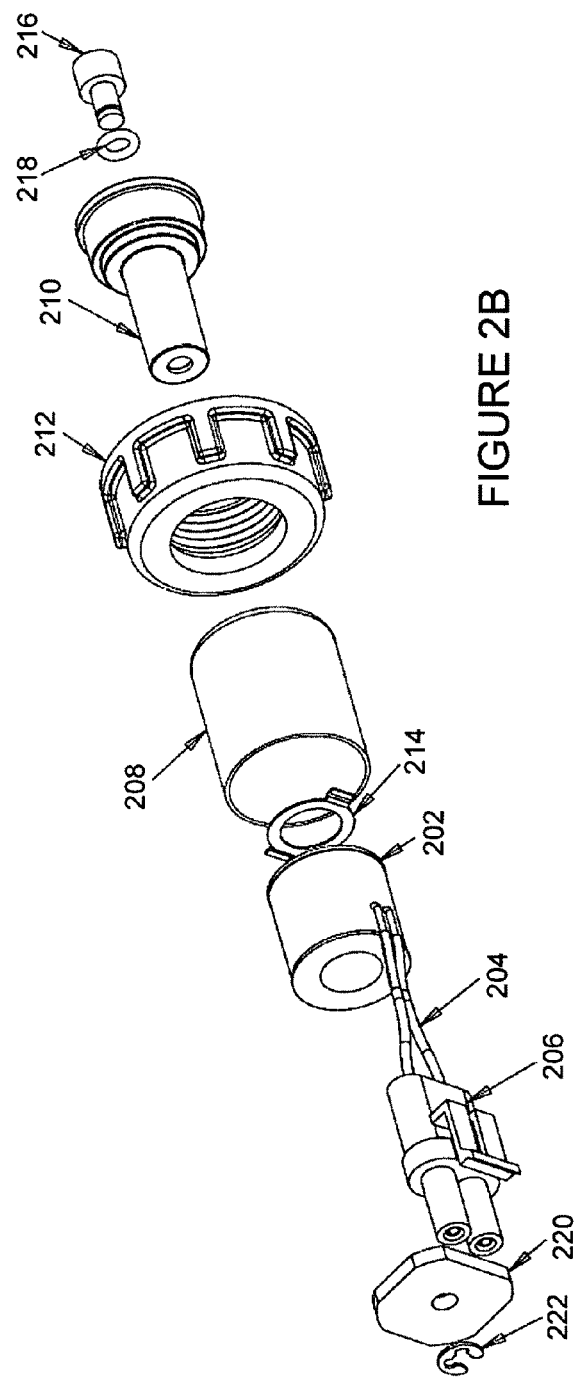

ACTUATOR FOR CONTROLLING
MATERIAL FLOW AND RELATED SYSTEM
AND METHOD

CROSS-REFERENCE TO RELATED
APPLICATIONS

This application claims priority under 35 U.S.C. §119(e) to U.S. Provisional Patent Application No. 60/966,127 filed on Aug. 24, 2007, which is hereby incorporated by reference.

TECHNICAL FIELD

This disclosure is generally directed to spraying and other distribution systems and more specifically to an actuator for controlling material flow and related system and method.

BACKGROUND

Agricultural entities and other entities often need to precisely apply materials (such as fertilizers, pesticides, weed killers, water, seeds, plants, or paint) to exact or near exact locations. For example, this could involve the use of large vehicles on farms or other agricultural facilities. In this example, each of these vehicles could include a tank of material to be released and long arms (called "booms") containing a number of nozzles through which the material is released. As another example, this could involve the use of large vehicles on roads, runways, parking lots, or other areas. In this example, the vehicles may include mechanisms for releasing paint onto the roads, runways, parking lots, or other areas.

These types of systems typically include actuators that control the flow of materials to be released, such as by allowing or blocking the flow of material into the nozzles. However, many conventional systems often lack any mechanism for individually controlling the actuators. Some conventional systems may include solenoids in the actuators for controlling the release of material. The solenoids move plungers in the actuators back and forth, which allows the systems to control whether the actuators are open (to allow release) or closed (to block release). The solenoids in conventional systems often use large metallic plungers in order to block the release of material. Unfortunately, these large metallic plungers are often expensive to manufacture. Conventional solenoids are also often unable to move the plungers effectively when the material being released is at a higher pressure.

SUMMARY

This disclosure provides an actuator for controlling material flow and related system and method.

In a first embodiment, an apparatus includes a pressure plate having a first hole and a second hole. The apparatus also includes a plunger configured to selectively cover the second hole of the pressure plate. The apparatus further includes a coil configured to move the plunger away from the pressure plate to uncover the second hole of the pressure plate in order to allow a material to flow through the apparatus. The coil is also configured to move the plunger towards the pressure plate to cover the second hole of the pressure plate in order to block the material from flowing through the apparatus.

In particular embodiments, pressure equalizes on a first side and a second side of the pressure plate after the plunger covers the second hole of the pressure plate.

In other particular embodiments, the apparatus further includes a valve seat. The coil is configured to magnetize and de-magnetize the valve seat. The valve seat attracts the plunger when magnetized to move the plunger away from the pressure plate.

In yet other particular embodiments, the apparatus also includes a first spring configured to push the plunger against the pressure plate to cover the second hole when the valve seat is de-magnetized. The apparatus further includes a second spring configured to push the pressure plate into a position that blocks the material from flowing through the apparatus after the plunger covers the second hole of the pressure plate.

In still other particular embodiments, the plunger includes a metal and a compliant tip. Also, the material can be applied under elevated pressure along an outer ring on one side of the pressure plate, and the second hole can be located in the pressure plate within the outer ring. In addition, the apparatus may further include a valve gasket and a nozzle configured to spray the material that flows through the apparatus.

In a second embodiment, a system includes an actuator configured to release a material, a wireless receiver configured to receive wireless positioning signals, and a control system configured to determine whether to open or close the actuator based on the wireless positioning signals. The actuator includes a pressure plate comprising a first hole and a second hole and a plunger configured to selectively cover the second hole of the pressure plate. The actuator also includes a coil configured to move the plunger away from the pressure plate to uncover the second hole of the pressure plate in order to allow the material to flow through the actuator. The coil is also configured to move the plunger towards the pressure plate to cover the second hole of the pressure plate in order to block the material from flowing through the actuator.

In a third embodiment, a method includes applying a material under pressure to a first side of a pressure plate in an actuator. The method also includes equalizing a pressure on a second side of the pressure plate and a pressure on the first side of the pressure plate using a first hole in the pressure plate. The method further includes uncovering a second hole in the pressure plate to decrease the pressure on the second side of the pressure plate. In addition, the method includes moving the pressure plate to open the actuator and allow the material to flow through the actuator.

In particular embodiments, the method also includes covering the second hole in the pressure plate to increase the pressure on the second side of the pressure plate. The method further includes moving the pressure plate to close the actuator and block the material from flowing through the actuator.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIGS. 2A through 2D illustrate an example actuator according to this disclosure;

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
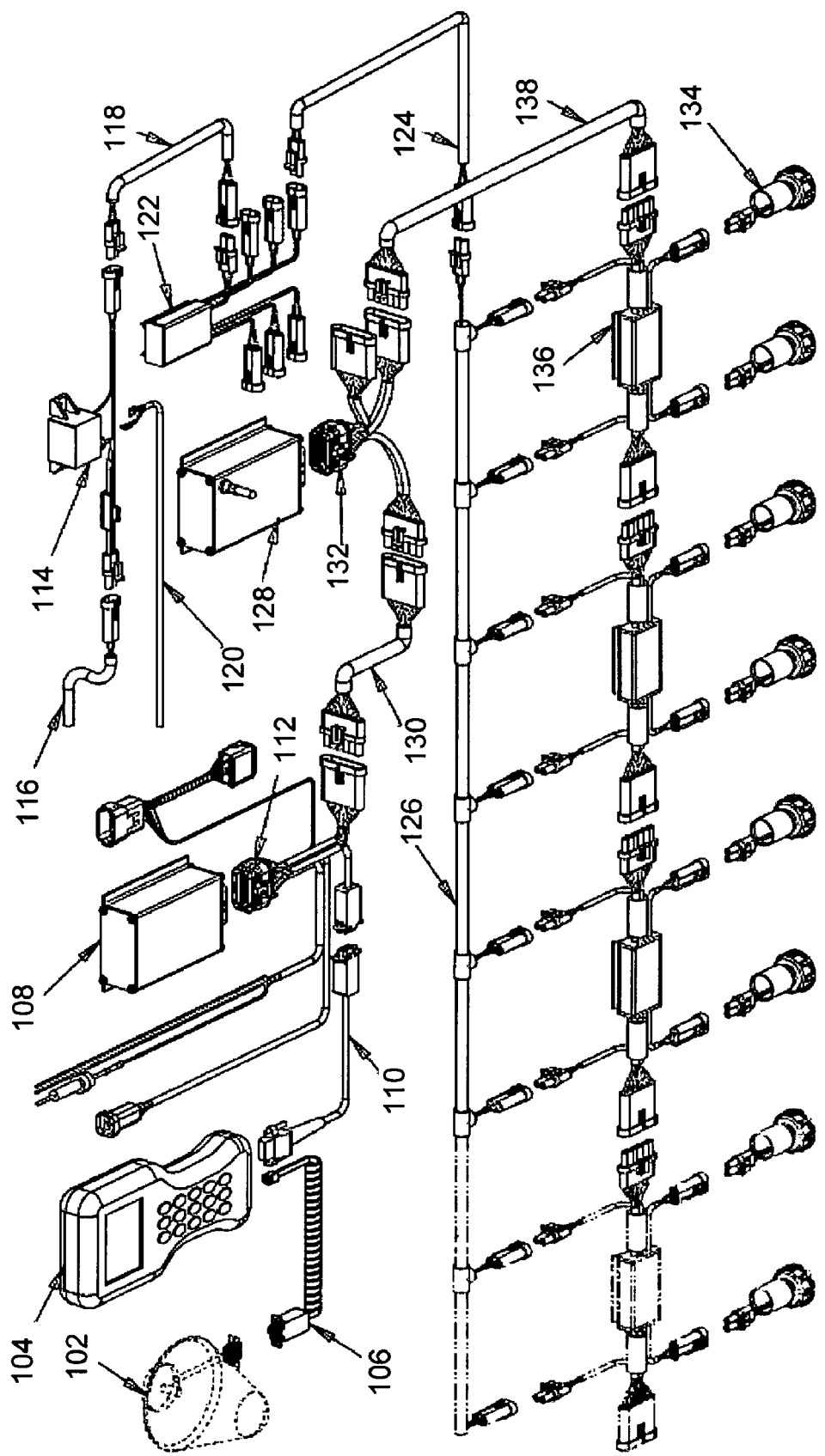
FIG. 1 illustrates an example system for releasing a material according to this disclosure.

FIG. 1 illustrates an example system 100 for releasing a material according to this disclosure. The embodiment of the system 100 shown in FIG. 1 is for illustration only. Other embodiments of the system 100 may be used without departing from the scope of this disclosure.

In this example, the system 100 includes a global positioning system (GPS) receiver 102. The GPS receiver 102 receives GPS signals from GPS satellites, allowing the system 100 to determine its location. For instance, the system 100 could be placed on a vehicle and used to release one or more materials in a field, to spray paint on a road, or to otherwise release any suitable material(s) in any suitable area(s). In these embodiments, the GPS receiver 102 allows the system 100 to track the position of the vehicle. This may allow, for example, the system 100 to ensure that the material is released at the appropriate locations. It may also allow the system 100 to avoid releasing the material in areas where the material has already been released. The GPS receiver 102 includes any suitable structure for receiving GPS signals. In other embodiments, other types of positioning technology could be used by the system 100, such as ultra wide band (UWB) or other positioning technology. Also, other types of positioning technology could supplement the use of GPS.

The GPS receiver 102 is coupled to a processing device 104. The processing device 104 determines the location of the system 100, such as the location of a vehicle on which the system 100 is used. The processing device 104 also determines when the system 100 should release material based on the identified location of the system 100. For example, the processing device 104 could receive GPS signals from the GPS receiver 102, determine the location of the system 100, and determine whether the location is one where material needs to be released. The processing device 104 could also determine whether material has already been released by the system 100 at that location, and the release of the material could be blocked in those locations where it has already been released. The processing device 104 could then output signals indicative of whether the system 100 should or should not release material in a particular area. The processing device 104 could include additional functionality or components, such as a radio frequency or other wireless transceiver that allows wireless communications between the processing device 104 and the system 100. The processing device 104 could perform any other or additional functionality for controlling the overall operation of the system 100. The processing device 104 includes any hardware, software, firmware, or combination thereof for controlling the system 100, such as a handheld computer or other handheld or portable device. As a particular example, the processing device 104 could include: one or more processors; one or more memories storing instructions and data used, collected, or generated by the processors; and one or more interfaces, such as a wireless interface or an RS-232 or Controller Area Network (CAN) bus.

The GPS receiver 102 is coupled to the processing device 104 by a cable 106. The cable 106 represents any suitable cable or other communication link for transporting signals between the GPS receiver 102 and the processing device 104. Although shown as a wired link, a wireless link could also be used between the GPS receiver 102 and the processing device 104.

A controller 108 controls the release of material by the system 100. For example, the controller 108 could control other components in the system 100 (such as one or more actuators described below) to thereby control the release of material in a specified area. The controller 108 may use the signals output by the processing device 104 to control the release of the material, such as by enabling the release of material when the processing device 104 identifies a particular area and disabling the release of material when the processing device 104 determines that material has already been released in a particular area. The controller 108 could provide any other or additional functionality, such as determining or estimating a speed of a vehicle on which the system 100 is being used. The controller 108 includes any suitable structure for controlling the release of material by the system 100, such as a microprocessor or microcontroller and one or more interfaces (like a CAN bus interface).

The controller 108 is coupled to the processing device 104 by a cable 110. The cable 110 represents any suitable cable or other communication link for transporting signals between the controller 108 and the processing device 104. Although shown as a wired link, a wireless link could also be used between the controller 108 and the processing device 104. In this example, the cable 110 is coupled to the controller 108 as part of a larger control/data cable 112, which couples the controller 108 to various other components in the system 100.

A relay/circuit breaker assembly 114 transfers power from a power cable 116 to a switched power cable 118. The power cable 116 could, for example, be coupled to a battery, a voltage produced by a vehicle, or other source of power. The relay/circuit breaker assembly 114 transfers power from the power cable 116 to other components in the system 100 in a controlled manner. The relay/circuit breaker assembly 114 also provides over-current protection for the system 100. The relay/circuit breaker assembly 114 includes any suitable structure for distributing power in the system 100, such as one or multiple relays and circuit breakers. Each of the cables 116-118 represents any suitable cable or other link for transferring power. The relay/circuit breaker assembly 114 is also coupled to one or more switch cables 120, which may be coupled to one or more switches in a vehicle or other location and allow manual control over the supply of power to the system 100. For instance, each switch could control the supply of power to a single boom or other structure. The switch cable 120 represents any suitable cable or other communication link for transferring signals.

Among other things, the relay/circuit breaker assembly 114 supplies power to a power junction 122, which distributes power to various other components of the system 100. For example, the power junction 122 may be coupled to a power cable 124, which is then coupled to a power bus 126. The power junction 122 includes any suitable structure for distributing power. The power cable 124 represents any suitable cable or other link for transferring power. The power bus 126 includes any suitable structure for providing power to multiple components, such as to multiple components used to control the release of a material. In particular embodiment, the power bus 126 is associated with one boom or other structure of a vehicle used to release a material, and multiple booms or other structures could be used on the vehicle (along with multiple power buses 126 and other components for distributing power to the booms or other structures).

In this example, the controller 108 can transmit or receive information through a wireless junction 128. For instance, the wireless junction 128 can transmit information to or receive information from external devices and systems. As a particular example, the processing device 104 could represent a handheld or other portable device that can be physically disconnected from the system 100. Once removed, the processing device 104 could still communicate wirelessly with the controller 108 through the wireless junction 128. As a particular example, a user could disconnect the processing device 104 and move into a position where individual actuators 134 (described below) can be viewed and individually activated and deactivated, allowing testing and maintenance of the system 100. The wireless junction 128 includes any suitable structure for transmitting and/or receiving wireless signals, such as a radio frequency transceiver.

The controller 108 is coupled to the wireless junction 128 by a cable 130. The cable 130 represents any suitable cable or other communication link for transporting signals between the controller 108 and the wireless junction 128. The cable 130 could also be used to transport power from the controller 108 to control modules 136 (described below). Although shown as a wired link, a wireless link could also be used between the controller 108 and the wireless junction 128. In this example, the cable 130 is coupled to the wireless junction 128 as part of a larger cable 132, which couples the wireless junction 128 to various other components in the system 100.

In this example embodiment, the release of material is carried out using actuators 134. The actuators 134 can be opened and closed to control the flow of material through the actuators 134, thereby controlling the release of the material. Each of the actuators 134 includes any suitable structure for controlling the flow of material, such as a valve assembly or other actuator with a solenoid that controls the movement of a plunger. One example embodiment of the actuators 134 is shown in FIGS. 2A through 2D, which are described below.

Control modules 136 are used to control the actuators 134. For example, each of the control modules 136 may receive control signals from the controller 108 that indicate whether its associated actuator or actuators 134 should be closed or opened (and optionally to what extent). The control modules 136 then send appropriate signals to the actuators 134 to open or close the actuators 134. The control modules 136 may also receive operating power from the power bus 126 or from a cable 138. Each of the control modules 136 includes any suitable structure for controlling one or more actuators. In this example, each control module 136 controls two actuators 134, although each control module 136 could control any suitable number of actuators 134 (including a single actuator 134).

As shown here, the cable 138 couples the control modules 136 to the controller 108. The cable 138 represents any suitable cable or other communication link for transporting signals between the controller 108 and the control modules 136. The cable 138 could also be used to transport power from the controller 108 to the control modules 136. Although shown as a wired link, a wireless link could also be used between the controller 108 and the control modules 136.

In some embodiments, the system 100 can be incorporated into or onto a vehicle containing a tank or other container for a liquid (such as fertilizer, pesticide, water, chemical, or paint), seeds, plants, or other material to be released. In particular embodiments, the vehicle may include multiple booms or other structures carrying a large number of actuators 134 and control modules 136. As a particular example, the vehicle could include six booms with a total of fifty four actuators 134 and twenty seven control modules 136, with one power bus 126 per boom, one power cable 124 per boom, and one cable 138 per boom.

In one aspect of operation, the system 100 operates to ensure that material is released in appropriate areas. For example, the system 100 can use GPS or other location-sensing technology to identify the current position of a vehicle or other object carrying the actuators 134. The system 100 could use this current position to determine whether material should be released, such as by using a map of intended areas and determining whether the actuators 134 are currently at those any of those intended areas. The system 100 could also use this current position to determine whether material has already been released in an area and to prevent a subsequent release of material in that area.

In another aspect of operation, each of the actuators 134 may include a pressure plate and a plunger. The pressure plate includes a first hole that allows pressure to be equal or approximately equal on both sides of the pressure plate when the actuator 134 is closed. The pressure plate also includes a second hole that is blocked by the plunger when the actuator 134 is closed. To open the actuator 134, the plunger is removed from the pressure plate, exposing the second hole in the plunger plate. This allows pressure on one side of the pressure plate to fall, thereby allowing the higher pressure on the other side of the pressure plate to move the pressure plate and open the actuator 134 (which allows release of material to occur). To close the actuator 134, the plunger is allowed to contact the pressure plate, which blocks the second hole in the pressure plate. This allows pressure on both sides of the pressure plate to equalize, and a spring can move the pressure plate back into its closed position. In this way, large metallic plungers may not be required in the actuator 134, and the material could be released under higher pressure, allowing an increase in the flow rate of the material.

In yet another aspect of operation, individual actuators 134 can be opened and closed in the system 100 (and the amount of opening could vary). The controller 108 or the processing device 104 simulates a speed of a vehicle that is releasing material, and the simulated speed is provided to another controller (not shown). The other controller uses the simulated speed to predict or control an amount of material provided by a pump to the actuators 134. The controller 108 or the processing device 104 can adjust the simulated speed based on how many of the actuators 134 are opened or closed (and to what extent the actuators 134 are opened). In this way, the amount of material provided by the pump can be more accurately predicted or controlled.

In still another aspect of operation, the control modules 136 receive addresses that are used for communications with the controller 108. These addresses can be assigned in the system 100 automatically, such as by executing an application on the processing device 104. A token line coupled to the control modules 136 (such as in the cable 138) can be used to individually identify the control modules 136 and to assign addresses to the control modules 136. As a result, operators of the system 100 are not required to use dip switches or other structures to individually assign addresses to the control modules 136. Additional details regarding this functionality is provided below.

Although FIG. 1 illustrates one example of a system 100 for releasing a material, various changes may be made to FIG. 1. For example, the system 100 could include any suitable number of each of the components in FIG. 1. Also, various components in FIG. 1 could be combined or omitted and additional components could be added according to particular needs (such as by combining the processing device 104 and the controller 108 or by omitting the wireless junction 128). Further, power can be distributed in any suitable manner in the system 100. In addition, FIG. 1 illustrates one operational environment in which the release of a material is controlled. This functionality could be used in any other suitable system or device. As particular examples, this functionality could be used to control the release of material by agricultural equipment, the spraying of paint or other material by a construction vehicle, or the release of any other material(s) in any suitable area(s).

FIGS. 2A through 2D illustrate an example actuator 134 according to this disclosure. The embodiment of the actuator 134 shown in FIGS. 2A through 2D are for illustration only. Other embodiments of the actuator 134 could be used without departing from the scope of this disclosure.

As shown in FIGS. 2A and 2B, the actuator 134 includes a coil 202, which is used to form a solenoid in the actuator 134. The coil 202 is capable of generating a magnetic field based on electrical conduction through the coil 202. The coil 202 represents a coil having any suitable number of turns formed from one or more conductive materials. The number of turns in the coil 202 could, for instance, be selected to help optimize an amount of energy required by multiple actuators 134 in light of a particular voltage used by the system 100 (such as 24V or 36V).

The coil 202 is coupled to two conductive wires 204, which are used to energize the coil 202. The conductive wires 204 represent any suitable wires or other conductive connections, such as 18 gauge wires. The wires 204 are coupled to a connector 206, which is used to couple the actuator 134 to electrical lines (such as lines coupling the actuator 134 to a control module 136). The connector 206 includes any suitable structure for coupling the actuator 134 to electrical lines, such as two female contacts and a POS tower.

The coil 202 is inserted into a coil housing 208. The coil housing 208 represents any suitable structure for retaining or housing the coil 202. A valve housing 210 is used to house or retain a valve (shown in FIGS. 2C and 2D) that controls a flow of material out of the actuator 134. The valve housing 210 is inserted through a valve keeper 212, the coil housing 208, and the coil 202. The valve housing 210 includes any suitable structure for retaining or housing a valve. The valve keeper 212 represents any suitable structure for retaining or housing the valve housing 210 and coupling or otherwise associating the valve housing 210 and the coil housing 208.

A spacer 214 maintains a desired separation between the valve housing 210 and the coil 202. The spacer 214 represents any suitable structure for maintaining a desired separation between at least two elements.

A valve seat 216 is inserted through an O-ring 218 and into the valve housing 210. In this example, the valve seat 216 includes a projection that can project out of a hole in the valve housing 210 and that can be inserted through a valve retainer 220. A snap ring 222 is secured to the end of the valve seat 216, securing the valve seat 216 within the coil 202. The valve seat 216 includes any suitable structure for helping to secure the valve housing 210 within the coil 202. The O-ring 218 includes any suitable structure for creating a seal between the valve housing 210 and the valve seat 216. The valve retainer 220 represents any suitable structure against which the valve housing 210 can be secured (to maintain the valve housing 210 within the coil 202). The snap ring 222 represents any suitable structure for securing the valve seat 216 to or against the valve retainer 220.

Figure 2C:
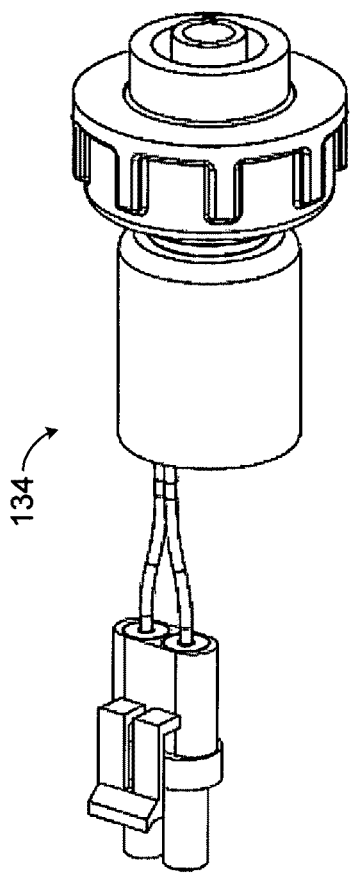
Figure 2D:
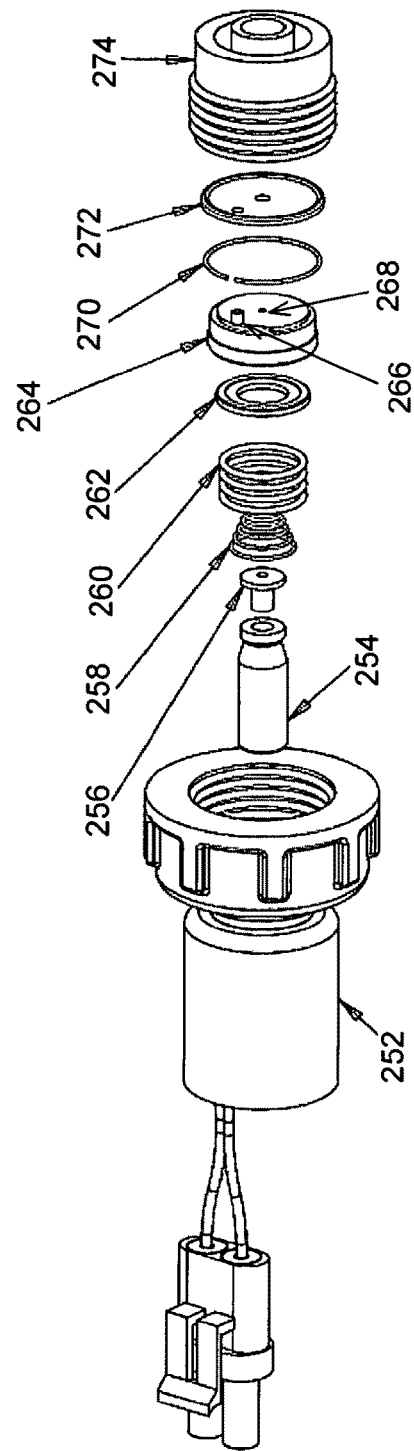

As shown in FIGS. 2C and 2D, a coil assembly 252 represents the various components (202, 208-222) shown in FIGS. 2A and 2B. A valve plunger 254 can be inserted into the valve housing 210 of the coil assembly 252. The valve plunger 254 represents a component that can be moved within the valve housing 210 by energizing the coil 202. The valve plunger 254 could have any suitable shape and size allowing the valve plunger 254 to be moved by the coil 202. The valve plunger 254 could also be formed of any suitable material(s), such as one or more metals or plastics. Collectively, the coil housing 208, the valve seat 216, the valve retainer 220, and the valve plunger 254 are formed from one or more materials suitable for providing a magnetic flux path that can cause movement of the plunger 254. Also, the valve housing 210 may be formed from one or more materials that do not substantially interfere with the magnetic flux path used to cause movement of the plunger 254.

A plunger tip 256 is inserted into a recess in or otherwise associated with the valve plunger 254. The plunger tip 256 can be used to form a seal against a pressure plate 264 (described below) when the valve plunger 254 is moved towards the pressure plate 264. The plunger tip 256 could have any suitable shape and size and be formed from any suitable material(s), such as one or more compliant materials.

A plunger spring 258 helps to push the tip 256 of the valve plunger 254 into the pressure plate 264 when the coil 202 is not energized. When the coil 202 is energized, the valve plunger 254 pushes against the plunger spring 258 and moves away from the pressure plate 264. A pressure plate spring 260 pushes against the pressure plate 264 and helps to close the actuator 134 until the coil 202 is energized and the actuator 134 is opened. Each of the springs 258-260 represents any suitable structure for biasing a component in a particular position or direction.

A throttle plate 262 is inserted between the pressure plate spring 260 and the pressure plate 264. The throttle plate 262 is used to provide a pressure drop across the pressure plate 264. As described below, this is done to facilitate opening and closing of the actuator 134. However, the throttle plate 262 could be omitted by suitably controlling the sizes of holes (described below) in the pressure plate 264.

The pressure plate 264 is used to block or permit the flow of material out of the actuator 134. In this example, the pressure plate 264 includes at least one first hole 266 and at least one second hole 268. The first hole 266 allows pressure to be equalized (equal or approximately equal) on both sides of the pressure plate 264 when the actuator 134 is closed. For example, as described below, material to be released can be applied under pressure against one side of the pressure plate 264. The first hole 266 allows the pressure on both sides of the pressure plate 264 to be equal or approximately equal as long as the second hole 268 is blocked by the plunger tip 256. Removing the plunger tip 256 from the second hole 268 allows the pressure on one side of the pressure plate 264 to drop, which allows movement of the pressure plate 264 and opening of the actuator 134. The pressure plate 264 includes any suitable structure capable of blocking or permitting the flow of material.

A retaining ring 270 helps to secure various components in the actuator 134 in place, and a valve gasket 272 is inserted against the pressure plate 264. The valve gasket 272 is used to form a seal against the nozzle assembly 274 (described below) when the actuator 134 is closed, helping to prevent leakage of material. The retaining ring 270 represents any suitable structure for securing components in the actuator 134. The valve gasket 272 represents any suitable structure for sealing against the nozzle assembly 274.

The nozzle assembly 274 is used to spray or otherwise release material flowing through the actuator 134 into an external environment, such as a field, road, or other area. The nozzle assembly 274 represents any suitable structure for spraying or otherwise releasing one or more materials.

Figure 3:
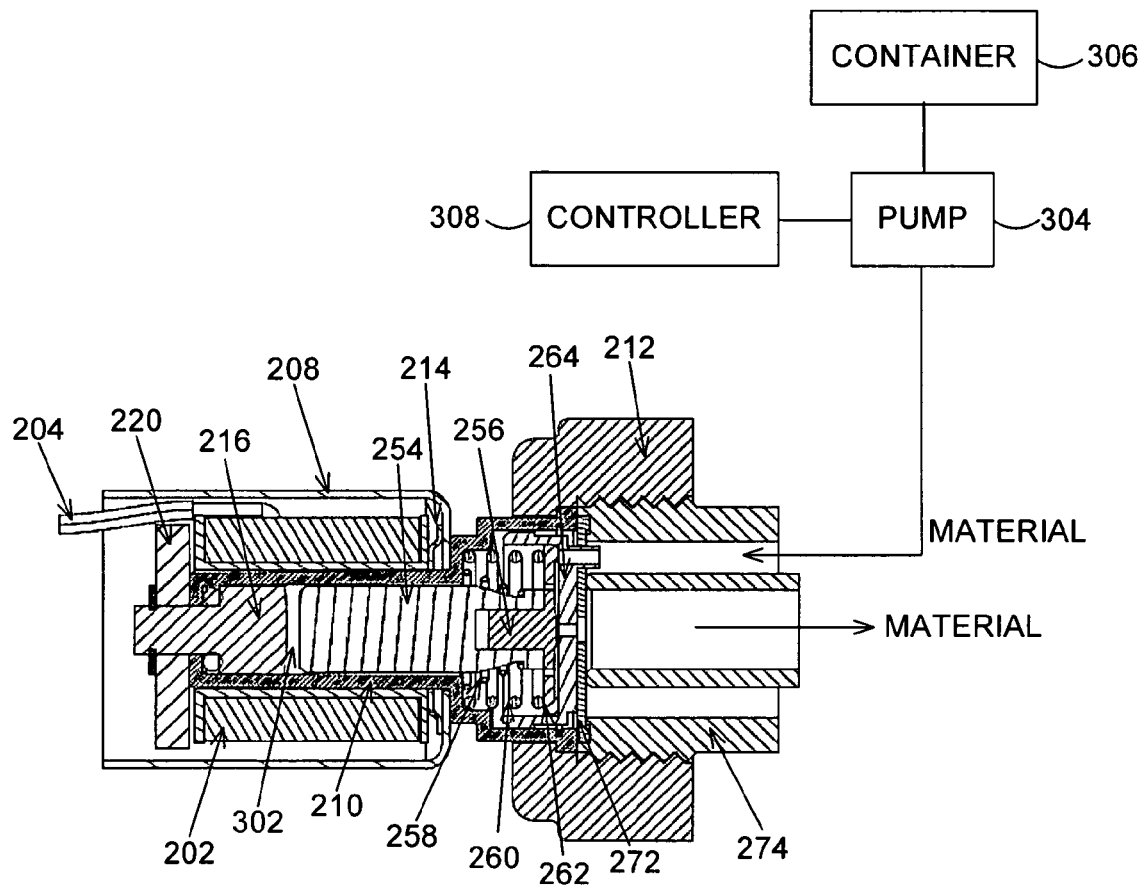
FIG. 3 illustrates an example cross section of the actuator in FIGS. 2A through 2D according to this disclosure.

FIG. 3 illustrates an example cross section of the actuator 134 in FIGS. 2A through 2D according to this disclosure. The cross section is taken along the length of the actuator 134 as shown in FIGS. 2C and 2D. The various components in the actuator 134 can be seen in the cross section. Also shown is a gap 302 between the valve seat 216 and the valve plunger 254. When the actuator 134 is closed, the valve seat 216 is separated from the valve plunger 254 by the gap 302. The gap 302 could have any suitable width, such as a width less than or equal to 0.05 inches.

As shown here, a pump 304 is used to provide material, possibly under higher pressure, to the actuator 134. The pump 304 could, for example, provide the material under a pressure of 60 pounds per square inch (PSI) or more to the actuator 134. The material provided by the pump 304 can be stored in a tank or other container 306. Also, the pump 304 is controlled by a controller 308. Among other things, the controller 308 can control the amount of material provided to the actuators 134 in the system 100 to ensure that a proper amount of material is released (such as a specified amount of material per acre of land or a specified amount of paint per distance). The pump 304 includes any suitable structure for providing material (possibly under pressure) to one or more actuators. The container 306 includes any suitable structure for storing material to be released. The controller 308 includes any hardware, software, firmware, or combination thereof for controlling an amount of material provided by the pump 304.

As noted above, the material provided to the actuator 134 can be under higher pressure. In this example, the material is provided to the actuator 134 along an outer ring of the pressure plate 264/valve gasket 272 under higher pressure. When the actuator 134 is closed, a higher pressure is also created on the opposite side of the pressure plate 264 (in the area around the valve plunger 254) due to the presence of the first hole 266. With equal or near equal pressure on both sides of the pressure plate 264, the pressure plate spring 260 helps to maintain the pressure plate 264 and valve gasket 272 against the nozzle assembly 274, blocking the material from exiting into the nozzle assembly 274 and preventing the release of the material.

To open the actuator 134, the valve seat 216 is magnetized using the coil 202. This pulls the valve plunger 254 towards the valve seat 216 and away from the pressure plate 264, which exposes the second hole 268 in the pressure plate 264. While the higher pressure remains on the front side of the pressure plate 264 due to the pump 304, the pressure on the opposite side of the pressure plate 264 is reduced because that area is now open to the external, lower-pressure environment through the hole 268. As a result, the pressure on the back side of the pressure plate 264 (the side facing the coil assembly 252) falls below the pressure on the front side of the pressure plate 264 (the side facing the nozzle assembly 274). This drop in pressure allows the higher pressure on the front side of the pressure plate 264 to move the pressure plate 264 back (from right to left in FIG. 3). This moves the pressure plate 264 and valve gasket 272 away from the nozzle assembly 274, allowing the material from the pump 304 to escape into the nozzle assembly 274 for release.

To close the actuator 134 again, the valve seat 216 is de-magnetized. Because the spring 258 pushes the valve plunger 254 towards the pressure plate 264, the tip 256 of the valve plunger 254 eventually contacts the pressure plate 264. In this example, the plunger tip 256 includes a generally flat surface that covers the second hole 268. Because of the hole 266, this allows the pressure on the back side of the pressure plate 264 to increase and eventually equal or nearly equal the pressure on the front side of the pressure plate 264. Because of this, the pressure plate spring 260 can push the pressure plate 264 back into a position that blocks the flow of material from the actuator 134.

In this way, the solenoid (coil 202) in the actuator 134 is used to control the pressure behind the pressure plate 264, while the pressure provided by the pump 304 is used to open the actuator 134. This helps to reduce or eliminate the need for a large metallic plunger, which is typically required to overcome the large force from the pump 304.

Although FIGS. 2A through 2D and FIG. 3 illustrate one example of an actuator 134, various changes may be made to FIGS. 2A through 2D and FIG. 3. For example, while a single first hole 266 and a single second hole 268 are shown, multiple first or second holes could be used. Also, as noted above, the throttle plate 262 could be omitted if the first hole 266 in the pressure plate 264 has a suitably small diameter and the second hole 268 in the pressure plate 264 has a suitably large diameter. Further, each of the components in the actuator 134 could have any suitable size, shape, and dimensions. The dimensions of the actuators 134 and its components could vary based on the use of the actuator 134, the voltage used in the system 100, or any other or additional design criteria. In addition, while described as having equal or near equal pressure on both sides of the pressure plate 264 when the actuator 134 is closed, any suitable pressure on the back side of the pressure plate 264 could be used to maintain the pressure plate 264 in its closed position (even if not equal or nearly equal to the pressure on the front side of the pressure plate 264).

Figure 4:
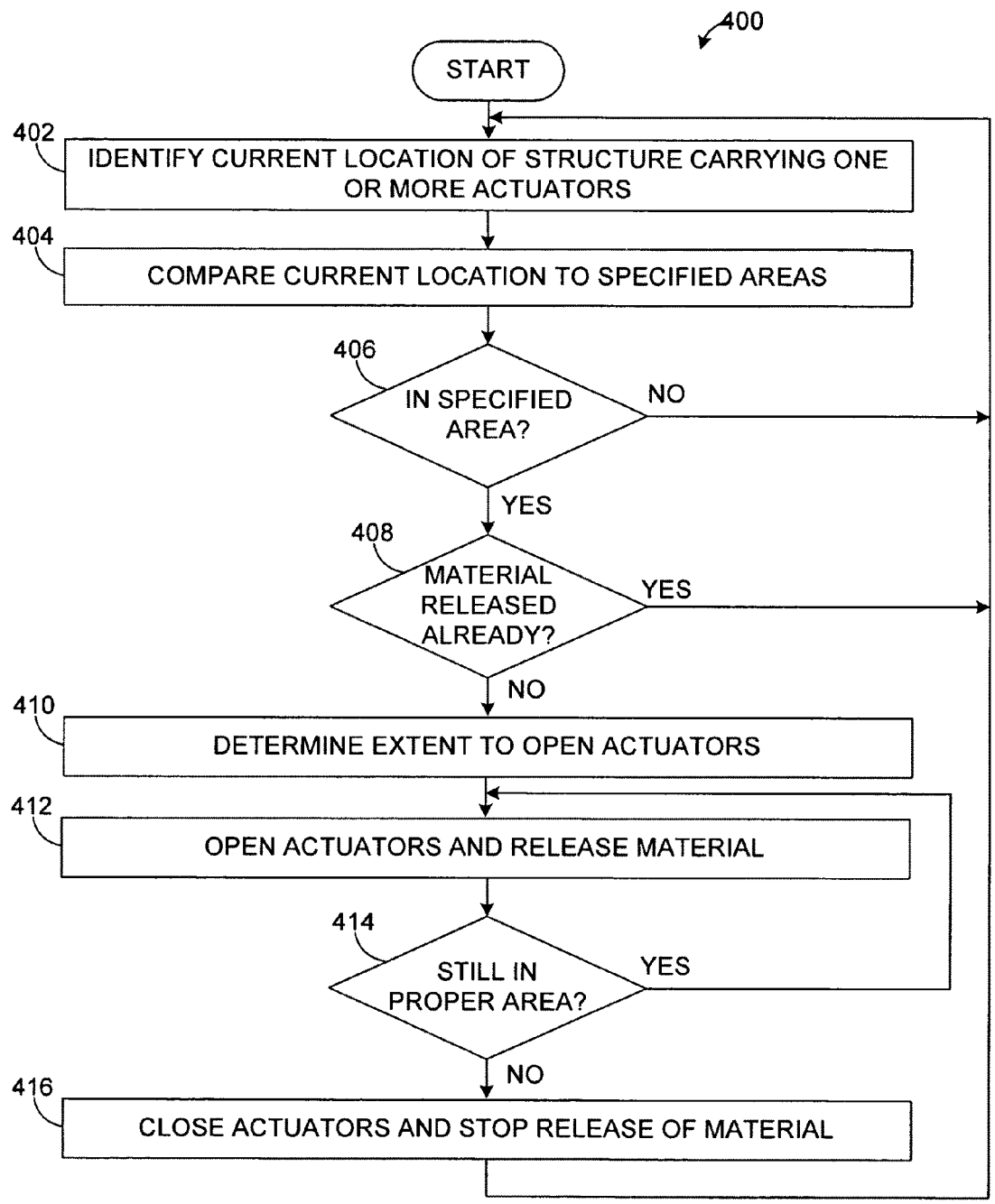
FIG. 4 illustrates an example method for controlling a release of a material according to this disclosure.

FIG. 4 illustrates an example method 400 for controlling a release of a material according to this disclosure. The embodiment of the method 400 shown in FIG. 4 is for illustration only. Other embodiments of the method 400 could be used without departing from the scope of this disclosure.

The current location of a vehicle or other structure carrying one or more actuators is identified at step 402. This may include, for example, a GPS receiver 102 or other wireless receiver receiving GPS or other signals. This may also include the receiver providing the received wireless signals to the processing device 104, which can use the wireless signals to identify the location of the vehicle or other structure.

The current location of the vehicle or other structure is compared to one or more specified areas at step 406. This could include, for example, the processing device 104 comparing the current location to a "map" of areas where a material is to be released. The "map" could take any suitable form, such as an intended path for the vehicle, sets of GPS coordinates, or areas defined by specified boundary lines.

If the current location is within a specified area at step 406, a determination is made whether material has already been released in this area at step 408. This could include, for example, the processing device 104 comparing prior determined positions of the vehicle or other structure to the current location. If the current location is not within a specified area or if material has already been released at the current location, the method 400 returns to step 402.

Otherwise, the extent to which one or more actuators are to be opened is determined at step 410. This may include, for example, the processing device 104 or the controller 108 determining whether an actuator 134 should be opened and to what extent. The one or more actuators are then opened and the material is released at step 412. This could include, for example, the controller 108 providing control signals to the control modules 136, which cause the appropriate actuators 134 to open. As long as the vehicle or other structure remains in a specified area at step 414, the release of the material can continue. When the vehicle or other structure is no longer in a specified area, the one or more actuators are closed and the release of the material is stopped at step 416. This could include, for example, the controller 108 providing control signals to the control modules 136, which cause the appropriate actuators 134 to close.

Although FIG. 4 illustrates one example of a method 400 for controlling a release of a material, various changes may be made to FIG. 4. For example, while shown as a series of steps, various steps in FIG. 4 could overlap, occur in parallel, or occur in a different order.

Figure 5:
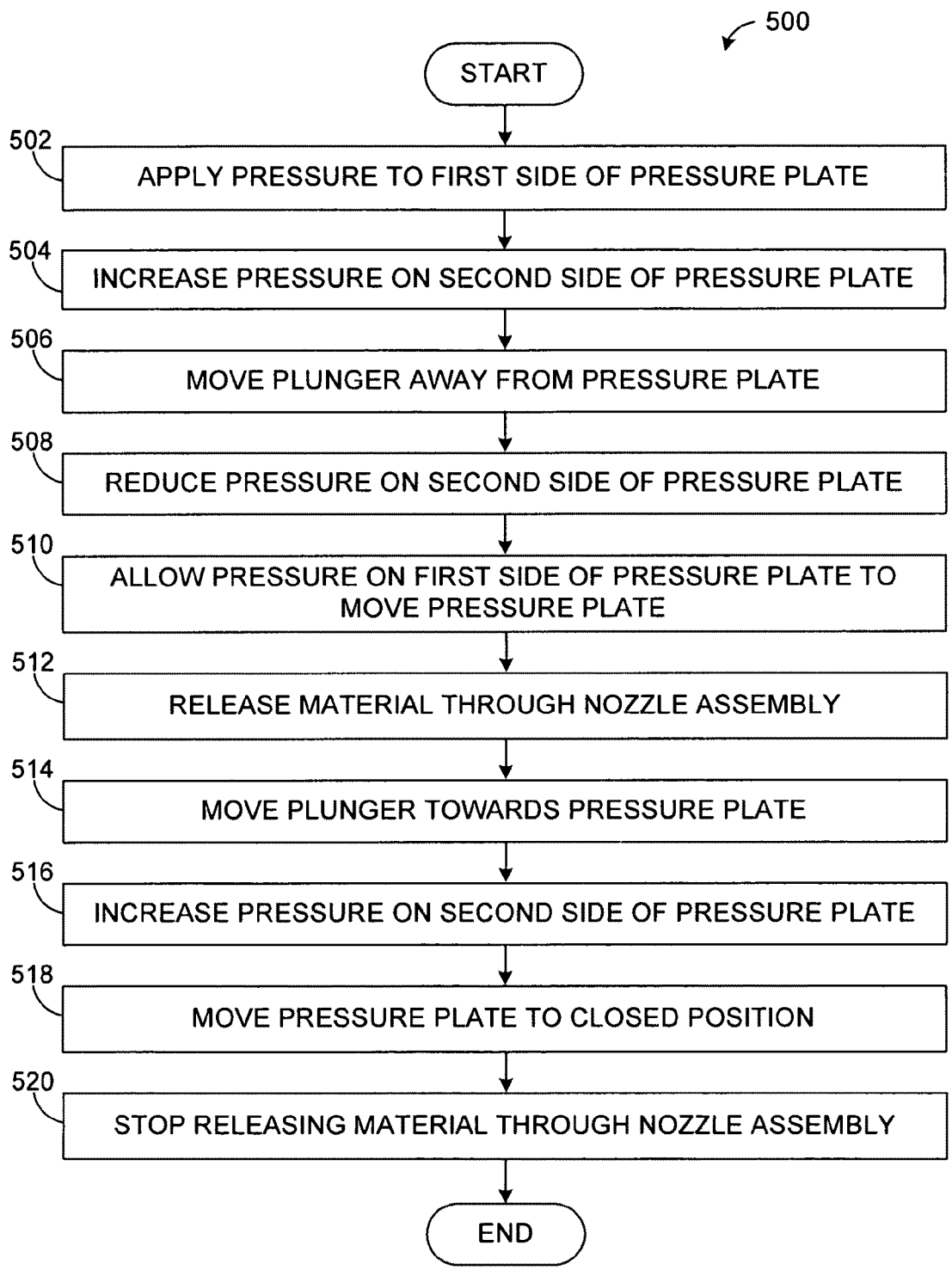
FIG. 5 illustrates an example method for controlling a material flow using an actuator according to this disclosure.

FIG. 5 illustrates an example method 500 for controlling a material flow using an actuator according to this disclosure. The embodiment of the method 500 shown in FIG. 5 is for illustration only. Other embodiments of the method 500 could be used without departing from the scope of this disclosure.

Pressure is applied to the first side of a pressure plate at step 502. This could include, for example, a pump 304 supplying one or more materials under pressure against the first side of the pressure plate 264 in the actuator 134. The material could be provided at any suitable elevated pressure. The pressure on the second side of the pressure plate is increased at step 504. This could include, for example, using the first hole 266 in the pressure plate 264 to allow the pressure on the second side of the pressure plate 264 to increase. At this point, the pressure plate spring 260 maintains the position of the pressure plate 264 against the nozzle assembly 274, and the actuator 134 remains closed.

To open the actuator, a plunger is moved away from the pressure plate at step 506. This may include, for example, energizing the coil 202 to magnetize the valve seat 216, which moves the valve plunger 254 towards the valve seat 216. This also exposes the second hole 268 in the pressure plate 264. The pressure on the second side of the pressure plate is reduced at step 508. This may include, for example, allowing the pressure on the second side of the pressure plate 264 to be reduced because that area is now open to the external, lower-pressure environment through the second hole 268 of the pressure plate 264. The higher pressure on the first side of the pressure plate moves the pressure plate at step 510, allowing material to be released at step 512. This may include, for example, the pressure plate 264 moving away from the nozzle assembly 274 due to the higher pressure of the material provided by the pump 304. This allows material from the pump 304 to reach the nozzle assembly 274 and be released.

To close the actuator again, the plunger is moved towards the pressure plate at step 514. This may include, for example, de-energizing the coil 202 to de-magnetize the valve seat 216. This allows the plunger spring 258 to push the valve plunger 254 towards the pressure plate 264, blocking the second hole 268 in the pressure plate 264. Once again, the pressure on the second side of the pressure plate is increased at step 516, and the pressure plate is moved into a closed position at step 518. This could include, for example, using the first hole 266 of the pressure plate to allow the pressure on the second side of the pressure plate 264 to increase. This allows the pressure plate spring 260 to push the pressure plate 264 back into the nozzle assembly 274, blocking the flow of material into the nozzle assembly 274. As a result, the release of material through the nozzle assembly is stopped at step 520.

Although FIG. 5 illustrates one example of a method 500 for controlling a material flow using an actuator, various changes may be made to FIG. 5. For example, while shown as a series of steps, various steps in FIG. 5 could overlap, occur in parallel, or occur in a different order.

Figure 6:
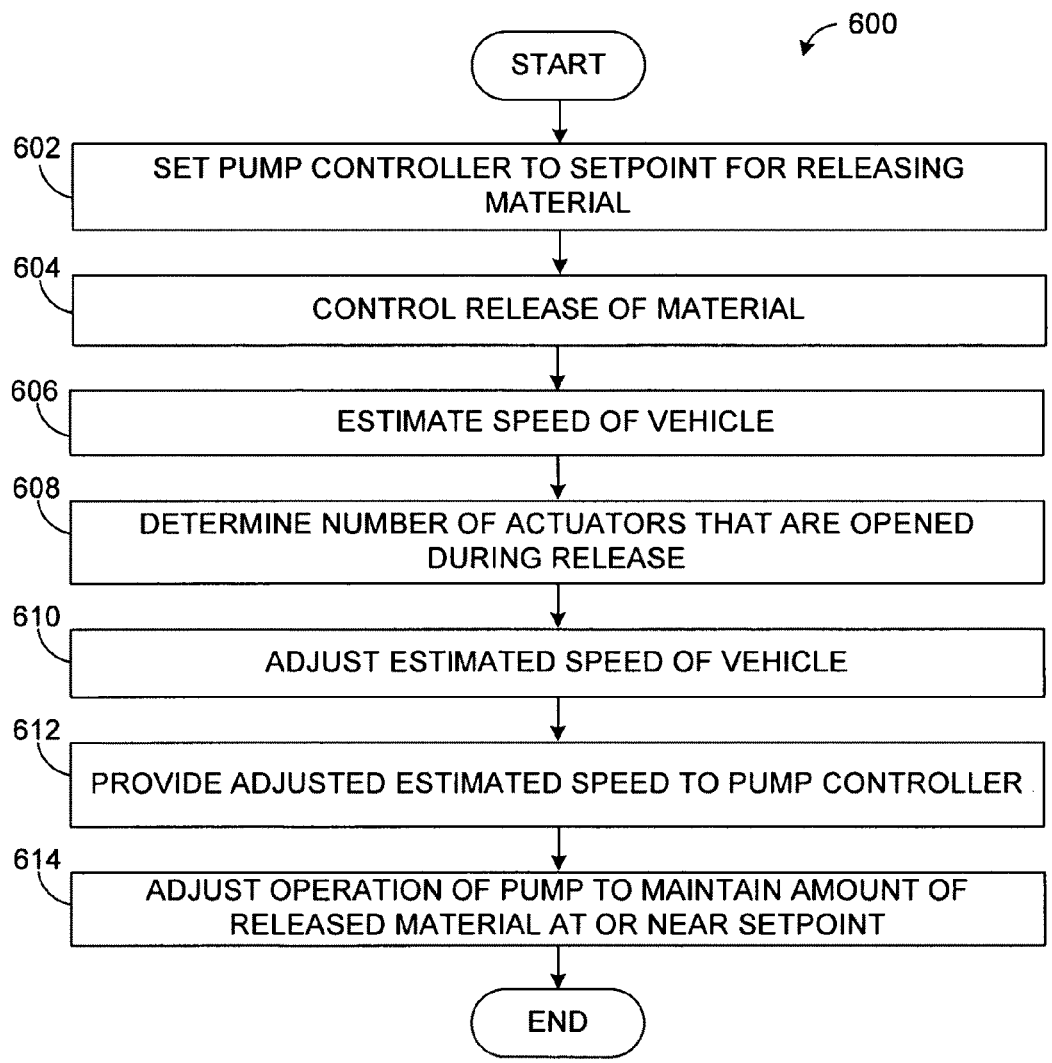
FIG. 6 illustrates an example method for controlling a pump using a simulated vehicle speed according to this disclosure.

FIG. 6 illustrates an example method 600 for controlling a pump using a simulated vehicle speed according to this disclosure. The embodiment of the method 600 shown in FIG. 6 is for illustration only. Other embodiments of the method 600 could be used without departing from the scope of this disclosure.

A pump controller is set to a particular setpoint for releasing material at step 602. This could include, for example, programming the controller 308 to a specified quantity of material to be sprayed per acre or a specified quantity of material to be released per unit of distance traveled. The controller 308 could be programmed in any suitable manner, such as by using the processing device 104.

When release of the material begins, the pump controller controls the pump to ensure that the amount of material being released remains at or near the setpoint at step 604. For example, the controller 308 typically uses a speed of a vehicle (along with other factors such as the width of the vehicle) to control the pump 304 so that the appropriate amount of material is released.

To facilitate this control, the speed of the vehicle is estimated at step 606. This could include, for example, the controller 108 estimating the vehicle's speed using any suitable information, such as information from a speed sensor, a radar gun, a vehicle's speedometer, a GPS receiver, or any other source. The number of actuators that are opened is determined at step 608. This could include, for example, the controller 108 or the processing device 104 monitoring how many of the actuators 134 are currently opened or closed during material release (and/or to what extent the open actuators are opened). Based on this, the estimated speed of the vehicle is adjusted at step 610. This could include, for example, the controller 108 or the processing device 104 adjusting the estimated speed of the vehicle based on the percentage of actuators 134 that are currently opened (and the extent that the open actuators are opened). As a particular example, if one quarter of the actuators 134 are currently shut off (closed), the controller 108 or the processing device 104 could reduce the estimated speed of the vehicle by 25%. In other words, the controller 108 or the processing device 104 reduces the estimated speed by a percentage equal to the percentage of closed actuators 134.

The adjusted estimated speed of the vehicle is provided to the pump controller at step 612, which adjusts the operation of the pump based on the adjusted estimated speed (if necessary) at step 614. This could include, for example, the controller 308 adjusting the amount of material provided to the pump 304 to compensate for the fact that one or more actuators 134 are closed.

In this way, the pump controller 308 (which is often pre-programmed to use vehicle speed to control the pump 304 and to assume that all actuators are opened) can be used without modification. Moreover, the vehicle speed can be adjusted by the controller 108 or the processing device 104 to take into account the number of actuators 134 currently opened or closed, allowing more accurate monitoring and control over the amount of material being released.

Although FIG. 6 illustrates one example of a method 600 for controlling a pump using a simulated vehicle speed, various changes may be made to FIG. 6. For example, while shown as a series of steps, various steps in FIG. 6 could overlap, occur in parallel, or occur in a different order.

Figure 7:
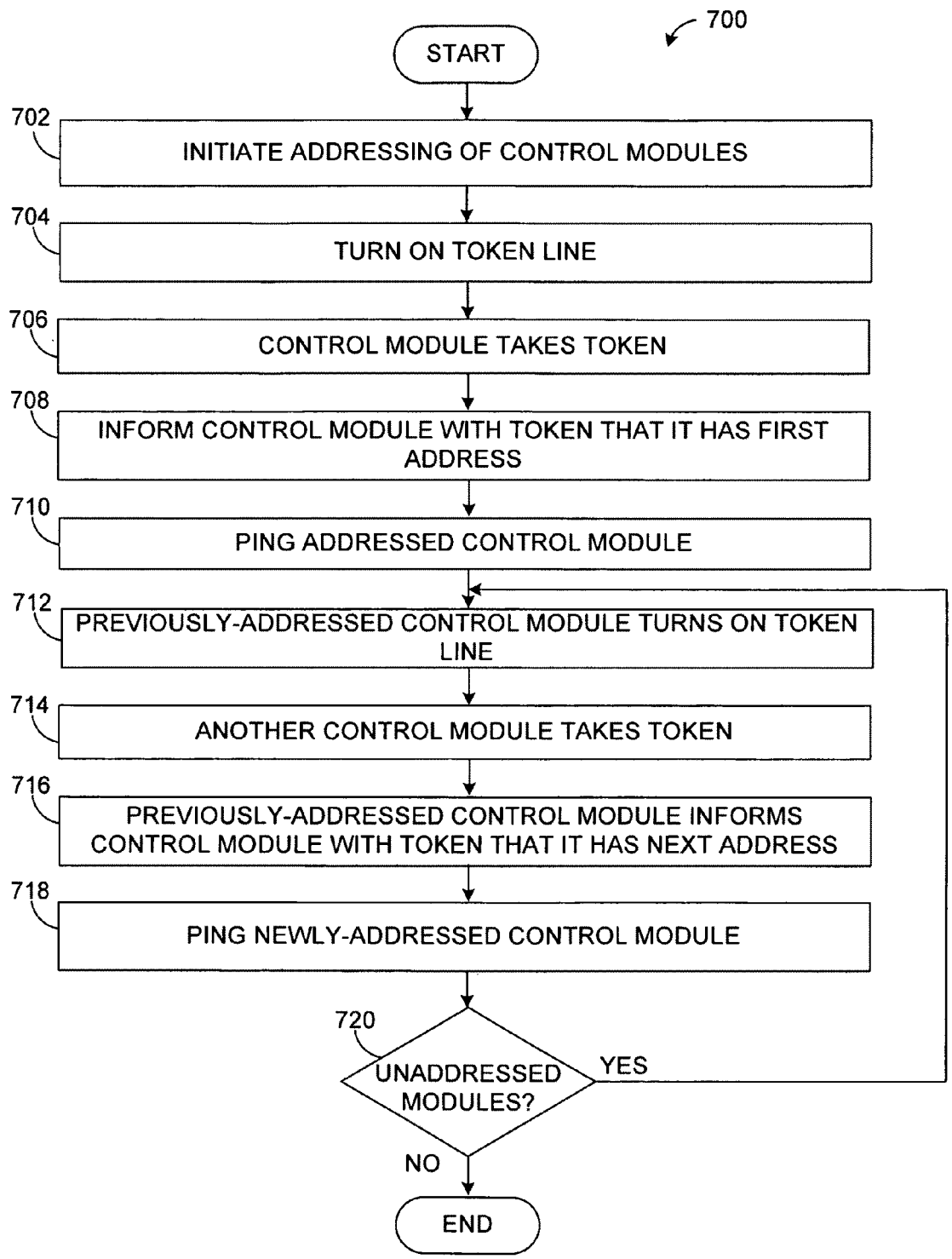
FIG. 7 illustrates an example method for assigning addresses to control modules in a system for releasing a material according to this disclosure.

FIG. 7 illustrates an example method 700 for assigning addresses to control modules in a system for releasing a material according to this disclosure. The embodiment of the method 700 shown in FIG. 7 is for illustration only. Other embodiments of the method 700 could be used without departing from the scope of this disclosure.

Addressing of the control modules in a system is initiated at step 702. This could include, for example, a user using the processing device 104 to initiate execution of an application for addressing the control modules 136. This could also include the processing device 104 causing the controller 108 to take certain actions, such as communicating with the wireless junction 128 or communicating over the token line in the cable 138. This step could be done during installation of the control modules 136 or any other suitable time.

The token line is turned on at step 704. This could include, for example, the wireless junction 128, the controller 108, or the processing device 104 communicating a token over the token line in the cable 138 to any of the control modules 136. One of the control modules takes the token at step 706, and the control module with the token is informed that it has the first address at step 708. This could include, for example, the wireless junction 128, the controller 108, or the processing device 104 informing the control module with the token that its address is "address #1" or some other suitable value. This can be done over, for example, communication lines in the cable 138 (such as a CAN bus). At this point, the control module with the token is pinged and various activities occur at step 710. This could include, for example, the processing device 104 or the controller 108 pinging the control module 136 that has just received its address using that address. The control module 136 could identify its current software version, and the processing device 104 or the controller 108 could update the software on the control module 136 if necessary. Note that any other or additional actions could occur at step 710.

The control module with the token (referred to as the "previously-addressed control module") turns on the token line at step 712, such as by communicating the token over the token line. Another of the control modules takes the token at step 714, and the previously-addressed control module informs the control module with the token that it has the next address at step 716. This could include, for example, the previously-addressed control module 136 incrementing the value of its own address and informing the control module 136 with the token that it has the next sequential address. Note that any previously-addressed control modules may be prevented from taking the token again, thereby helping to ensure that the same control module 136 does not receive two different addresses. The control module with the token (referred to as the "newly-address control module") is then pinged and various activities can occur at step 718. This could allow the processing device 104 or the controller 108 to update the software on the newly-address control module 136 or to perform any other or additional actions.

If any unaddressed control modules remain at step 720, the process returns to step 712 (where the newly-address control module becomes the previously-address control module and passes on the token to an unaddressed control module). The total number of control modules may be known in advance to the processing device 104 or the controller 108, so step 720 could include determining whether all of the expected number of control modules have been addressed.

In this way, the addressing may proceed from one control module 136 to the next, where each control module (except the last one) identifies the address of the next control module. Note that this process could be performed multiple times, such as when the process is performed once for the control modules 136 on each of multiple booms on a vehicle.

Although FIG. 7 illustrates one example of a method 700 for assigning addresses to control modules in a system for releasing a material, various changes may be made to FIG. 7. For example, while shown as a series of steps, various steps in FIG. 7 could overlap, occur in parallel, or occur in a different order.

Figure 8:
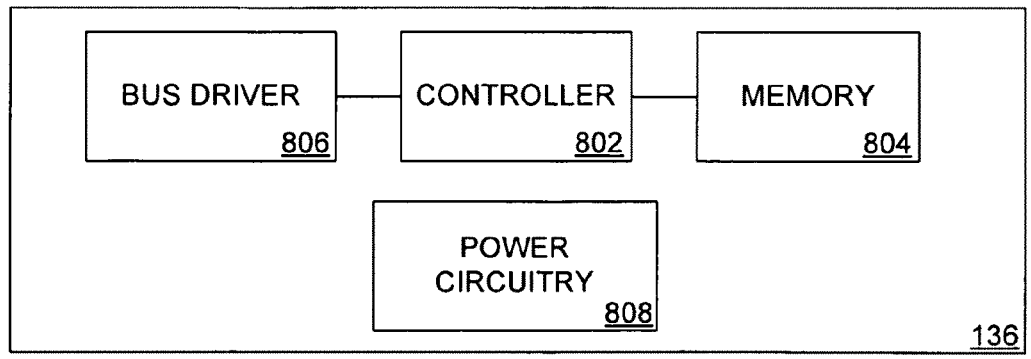
FIG. 8 illustrates an example control module according to this disclosure.

FIG. 8 illustrates an example control module 136 according to this disclosure. The embodiment of the control module 136 shown in FIG. 8 is for illustration only. Other embodiments of the control module 136 could be used without departing from the scope of this disclosure.

As shown here, the control module 136 includes a controller 802, which controls the overall operation of the control module 136. For example, the controller 802 may receive data over the cable 138, such as control signals instructing the control module 136 to open or close its actuators 134. The controller 802 could also receive data over the cable 138 related to the addressing of the control modules 136. The controller 802 could further perform operations to obtain an address and to transmit data related to its address. The controller 802 includes any hardware, software, firmware, or combination thereof for controlling operation of the control module 136. As particular examples, the controller 802 could represent a processor, microprocessor, microcontroller, field programmable gate array, or other processing or control device.

A memory 804 is coupled to the controller 802. The memory 804 stores any of a wide variety of information used, collected, or generated by the control module 136. For example, the memory 804 could store information received over the cable 138 or information to be transmitted over the cable 138. The memory 804 could also the address of the control module 136. The memory 804 could further store instructions executed by the controller 802. The memory 804 includes any suitable volatile and/or non-volatile storage and retrieval device(s).

A bus driver 806 facilitates communications over a bus, such as the cable 138. The bus driver 806 could, for example, operate to seize a token during addressing of the control modules 136 and to transmit data over the cable 138 using a specified protocol. The bus driver 806 includes any suitable structure(s) for communicating over one or more communication links.

Power circuitry 808 provides operating power to the other components of the control module 136. For example, the power circuitry 808 could receive power from an external source, such as from the power bus 126 or the cable 138. The power circuitry 808 could then condition or otherwise process the power for use by the control module 136. The power circuitry 808 includes any suitable structure(s) for providing power, such as one or more field effect transistors (for switching power), a power regulator, and a power filter.

Although FIG. 8 illustrates one example of a control module 136, various changes may be made to FIG. 8. For example, various components in FIG. 8 could be combined, subdivided, or omitted and additional components could be added according to particular needs.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video/versatile disc (DVD), or any other type of memory.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a movable pressure plate comprising a first hole and a second hole;
   a plunger configured to selectively cover the second hole of the pressure plate;
   a valve seat; and
   a coil configured to:
      magnetize the valve seat to move the plunger away from the pressure plate and uncover the second hole of the pressure plate in order to allow a material to flow through the apparatus, the valve seat configured to attract the plunger when magnetized to move the plunger away from the pressure plate; and
      demagnetize the valve seat to move the plunger towards the pressure plate and cover the second hole of the pressure plate in order to block the material from flowing through the apparatus.

2. The apparatus of claim 1, wherein the coil is configured to demagnetize the valve seat to move the plunger towards the pressure plate and cover the second hole of the pressure plate in order to equalize pressure on a first side and a second side of the pressure plate.

3. The apparatus of claim 1, wherein the first hole is located along an outer edge of the pressure plate and the second hole is located approximately in a center of the pressure plate.

4. The apparatus of claim 1, further comprising:
   a first spring configured to push the plunger against the pressure plate to cover the second hole when the valve seat is de-magnetized; and
   a second spring configured to push the pressure plate into a position that blocks the material from flowing through the apparatus after the plunger covers the second hole of the pressure plate.

5. The apparatus of claim 1, wherein the plunger comprises a metal and a compliant tip.

6. The apparatus of claim 1, wherein the first hole is located in the pressure plate within an outer ring along which the material is applied under elevated pressure on one side of the pressure plate.

7. The apparatus of claim 1, further comprising:
   a valve gasket and a nozzle configured to spray the material that flows through the apparatus.

8. A system comprising:
   an actuator configured to release a material;
   a wireless receiver configured to receive wireless positioning signals; and
   a control system configured to control the actuator based on the wireless positioning signals;
   wherein the actuator comprises:
      a movable pressure plate comprising a first hole and a second hole;
      a plunger configured to selectively cover the second hole of the pressure plate;
      a valve seat; and
      a coil configured to:
         magnetize the valve seat to move the plunger away from the pressure plate and uncover the second hole of the pressure plate in order to allow the material to flow through the actuator, the valve seat configured to attract the plunger when magnetized to move the plunger away from the pressure plate; and
         demagnetize the valve seat to move the plunger towards the pressure plate and cover the second hole of the pressure plate in order to block the material from flowing through the actuator.

9. The system of claim 8, wherein the coil is configured to demagnetize the valve seat to move the plunger towards the pressure plate and cover the second hole of the pressure plate in order to equalize pressure on a first side and a second side of the pressure plate.

10. The system of claim 8, wherein the first hole is located along an outer edge of the pressure plate and the second hole is located approximately in a center of the pressure plate.

11. The system of claim 8, wherein the actuator further comprises:
    a first spring configured to push the plunger against the pressure plate to cover the second hole when the valve seat is de-magnetized; and
    a second spring configured to push the pressure plate into a position that blocks the material from flowing through the actuator after the plunger covers the second hole of the pressure plate.

12. The system of claim 8, wherein the plunger comprises a metal and a compliant tip.

13. The system of claim 8, wherein the first hole is located in the pressure plate within an outer ring along which the material is applied under elevated pressure on one side of the pressure plate.

14. The system of claim 8, wherein the actuator further comprises:
    a valve gasket and a nozzle configured to spray the material that flows through the actuator.

15. The system of claim 8, wherein the control system comprises:
    a processing device configured to determine a position associated with the actuator based on the wireless positioning signals and to determine whether to open or close the actuator based on the determined position; and
    a controller configured to control the opening and closing of the actuator based on signals from the processing device.

16. The system of claim 15, wherein the processing device is configured to determine whether to open or close the actuator by determining whether the material has already been released at the determined position.

17. A method comprising:
- equalizing a pressure on first and second sides of a movable pressure plate in an actuator using a first hole in the pressure plate;
- uncovering a second hole in the pressure plate to decrease the pressure on the second side of the pressure plate by magnetizing a valve seat using a coil, the valve seat attracting a plunger when magnetized to move the plunger away from the pressure plate and uncover the second hole of the pressure plate;
- moving the pressure plate to open the actuator and allow material to flow through the actuator;
- covering the second hole in the pressure plate to increase the pressure on the second side of the pressure plate by demagnetizing the valve seat; and
- moving the pressure plate to close the actuator and block the material from flowing through the actuator.

18. The method of claim 17, wherein the first hole is located along an outer edge of the pressure plate and the second hole is located approximately in a center of the pressure plate.

19. The method of claim 17, further comprising:
- determining a position associated with the actuator based on wireless positioning signals; and
- determining whether to open or close the actuator based on the determined position.

20. The method of claim 17, wherein:
- covering the second hole in the pressure plate comprises using a first spring to move the plunger towards the pressure plate; and
- moving the pressure plate to close the actuator comprises using a second spring to push the pressure plate to a position that blocks the material from flowing through the actuator.

* * * * *